L. BRUDER.
DUMPING VEHICLE.
APPLICATION FILED APR. 10, 1912.
1,078,246.
Patented Nov. 11, 1913.
2 SHEETS—SHEET 1.
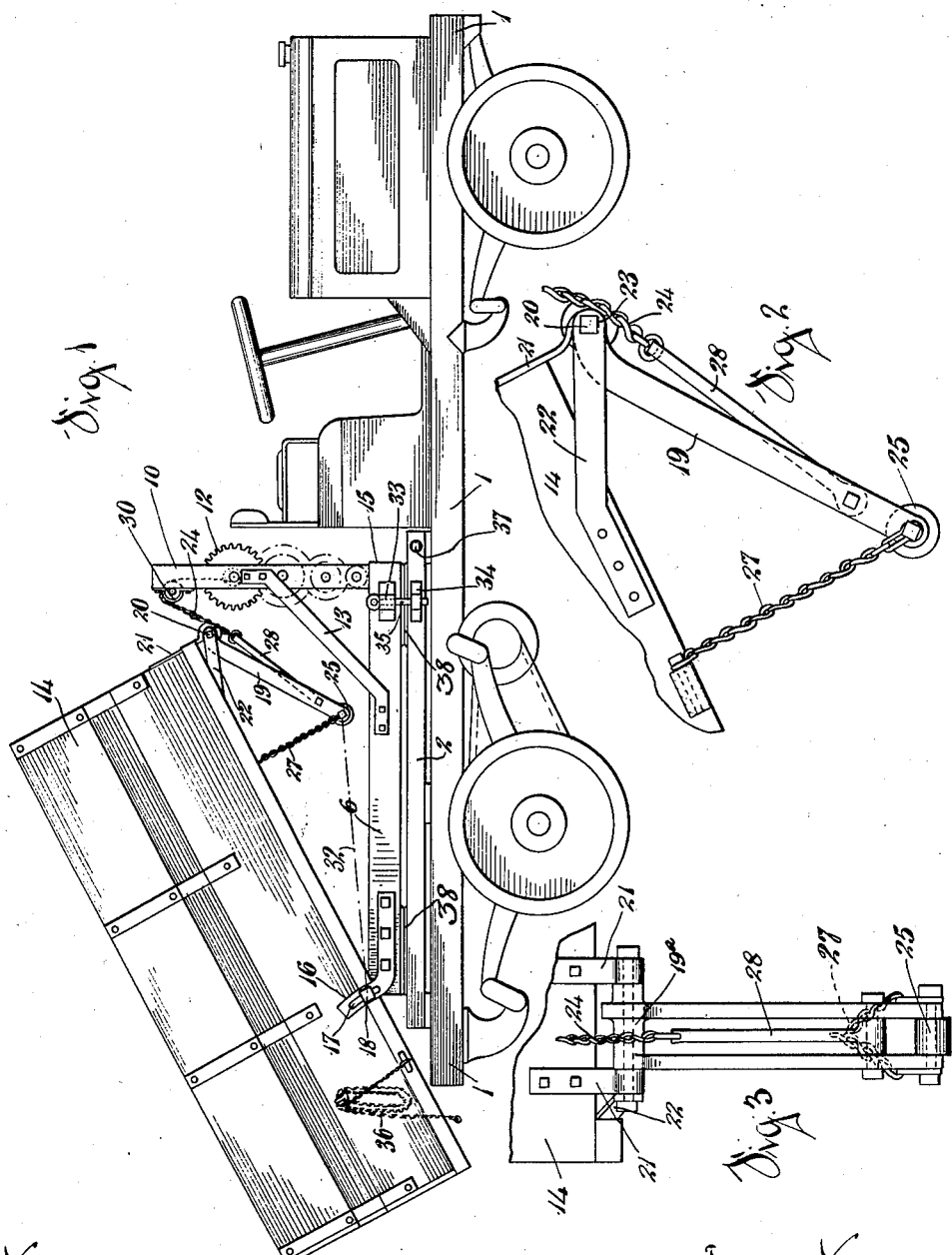

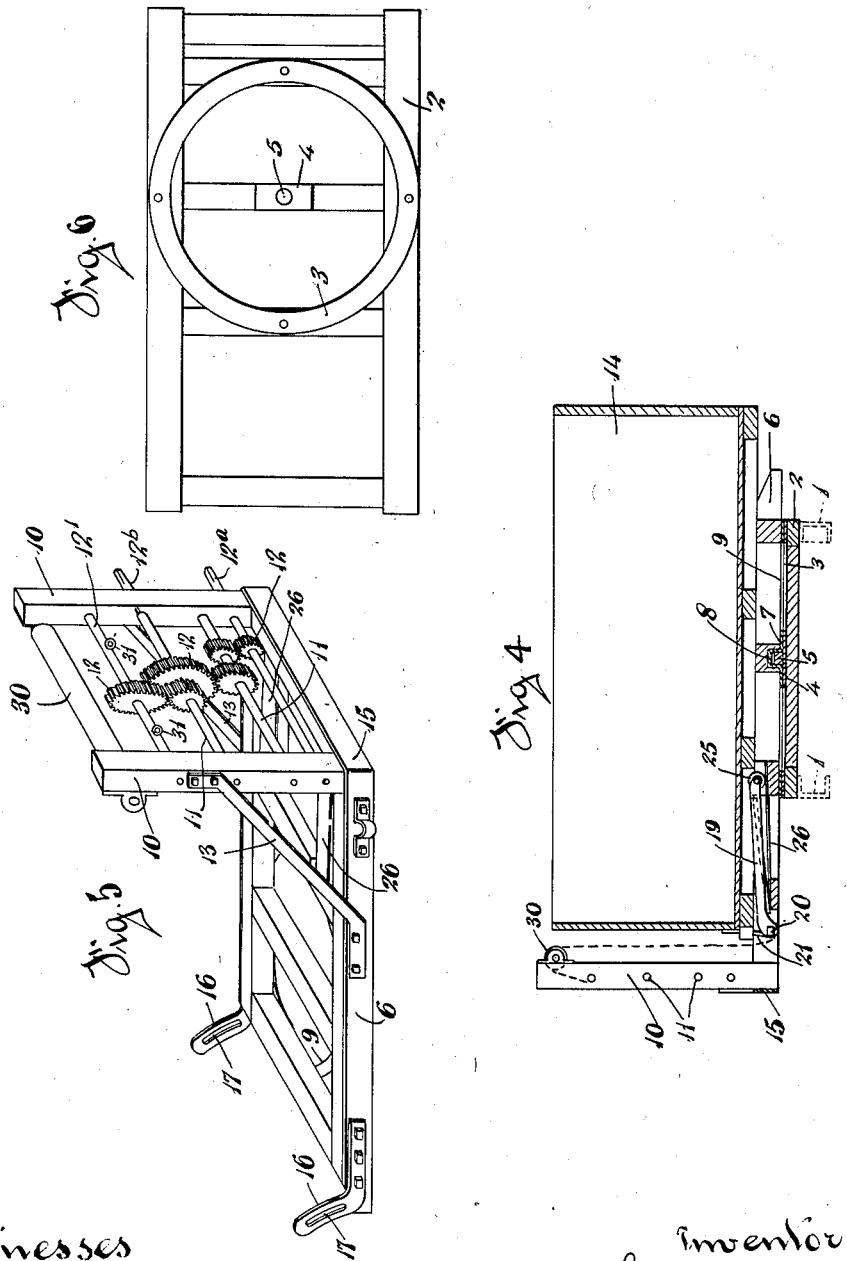

UNITED STATES PATENT OFFICE.

LAWRENCE BRUDER, OF COVINGTON, KENTUCKY.

DUMPING-VEHICLE.

1,078,246.  Specification of Letters Patent.  Patented Nov. 11, 1913.

Application filed April 10, 1912. Serial No. 689,884.

*To all whom it may concern:*

Be it known that I, LAWRENCE BRUDER, a citizen of the United States, residing at Covington, in the county of Kenton and State of Kentucky, have invented certain new and useful Improvements in Dumping-Vehicles, of which the following is a specification.

My invention relates to that class of vehicles, the bodies of which are adapted to be dumped and more particularly to the specific means whereby the body can be rotated and dumped at any desired position upon the truck or chassis.

The object of my invention is to provide a vehicle with efficient, durable, and inexpensive means whereby the body of said vehicle may be rotated in a horizontal plane upon the vehicle truck and may be dumped in any position which it is thereby adapted to assume. This is a great advantage especially to trucks adapted to carry coal inasmuch as they can be driven right up to and parallel with the curb and dumped if desired without having to back the truck up to the curb and thereby interfere with traffic on the street.

A further object of my invention is to construct a vehicle body having dumping means which enables the body to be raised higher than the ordinary dump body without increasing the height of the frame carrying the operating mechanism.

My invention consists broadly in the combination with a vehicle body of means whereby it is adapted to be raised at the forward end, said means consisting of lifting arms pivoted at the front end adapted to be operated in a vertical plane, said lifting arms adapted to be horizontally disposed under the vehicle body when said body is in its lowered position, and means for exerting pressure on the free ends of said lifting arms whereby they pry the vehicle body upward at the forward end, said lifting arms engaging the base upon which the body is mounted, and a flexible connection whereby the lifting arms are limited in their movement relative to the vehicle body.

My invention consists further in that arrangement and combination of parts as will be described in the following specification and pointed out in the appended claims.

In the drawings: Figure 1 is a side elevational view of a motor truck equipped with my invention; Fig. 2 is a detail side elevational view of the lifting arm; Fig. 3 is a front elevational view of same; Fig. 4 is a sectional view showing the body turned ninety degrees on the truck frame; Fig. 5 is a perspective view of the rotatable frame and operating mechanism; and Fig. 6 is a plan view of the stationary frame on the truck.

Referring more particularly to the drawings, 1 illustrates a truck frame shown as the frame of a motor truck and 2 the stationary frame securely fastened thereto in any desirable manner.

The stationary frame or base 2 is provided with a bearing ring 3 bolted thereto and a plate 4 provided with a lug or pin 5 near the center thereof.

A rotatable frame 6 (best shown in Fig. 5) is adapted to be placed on the frame 2 and is provided with a plate 7 having a socket 8 therein into which the lug 5 on plate 4 is adapted to fit. The frame 6 is also provided with a bearing ring 9 which is adapted to bear upon the bearing ring 3 on the stationary frame 2. The frame 6 is thus adapted to rotate on the lug 5 with the bearing on bearing rings 3 and 9. The rotatable frame is preferably constructed of hard timber and has two vertical posts 10 at the forward end between which a series of shafts 11 extend having their journals on the said posts. These shafts carry a series of gear wheels 12 which are properly graduated in size and proportioned to render the raising of the body comparatively easy under load.

The upright posts 10 are properly braced by braces 13 which also serve to prevent the body 14 from shifting its position relative to the rotatable frame 6 when said body is down. The frame 6 may also be reinforced by a strip or band of metal 15 extending around same. The rotatable frame 6 is further provided with two retaining arms 16 one on each side at the rear end of said frame and each is provided with a slot 17 through which a bolt 18 extends. The bolts 18 are fastened to the vehicle body a suitable distance from the rear end to form a pivot for the body when being dumped. When the rear end of the body has been raised high enough to strike the frame 2 of the truck it can be raised higher if desired at which time the body pivots at the point of contact with the frame 2 and the bolts 18 ride up in the slots 17 in the retaining arms 16. However, it is seldom required to raise the body that distance.

The vehicle body 14 is provided with two lifting arms 19 pivoted at 20 to straps or brackets 21 mounted on the vehicle body 14. These straps or brackets are braced to the body by bracing arms 22 thereby forming a strong and secure pivot for the lifting arms. These lifting arms are preferably made as shown in Fig. 3 with two parallel arms connected at the top or pivotal point. The connected portion 19ª is provided with a hole to receive a shaft or bolt 23 which bears in the straps or brackets 21. The connected portion is also provided with a flange to guide the chain or flexible connection 24 and which tends to keep it from moving laterally. A roller 25 is provided at the bottom of lifting arms 19 which is adapted to engage a track or plate 26 mounted on the movable frame 6. A flexible connection such as a chain 27 is provided to limit the movement of the lifting arms relative to the body. Pivoted just above the roller 25 is a link arm 28 which forms part of the flexible connection or chain 24.

When the body is down the arms 19 fold or swing under the body 14 as best shown in Fig. 4, the arms 19 being so held and positioned as to fold or swing backwardly when they engage the tracks 26 on the movable frame 6 while the body is being lowered. Sufficient space is left between the frames 6 and the body frame to allow the lifting arms to rest therebetween comfortably. The link arm 28 is provided to prevent the chain from tangling and becoming bulky under the vehicle body when the lifting arms are folded under.

A drum 30 is provided near the top of the upright posts 10 over which the flexible connection 24 is adapted to pass. The flexible connection is then brought down and connected to the shaft 12′ by means of eyebolts 31. When this shaft 12′ is rotated the flexible connection 24 is wound upon same and pull exerted on the lifting arms which raises the vehicle body.

The lowermost shaft 12ª is provided with a squared end upon which a handle of any suitable construction is placed to turn it and thereby raise the body. The shaft 12ᵇ may also be provided with a square end to allow the body to be quickly lowered.

The operation of the device is as follows: When the shafts 12 are operated the chain or flexible connection 24 is wound up on the shaft 12′ after first passing over the drum 30. The lifting arms being at rest under the vehicle body are gradually pulled out, the pull being exerted at the roller or free ends of the lifting arms through the link arm 28. When this occurs the lifting arms gradually pry the vehicle body up by the rollers engaging the tracks 26 until the chain 27 becomes taut, then the rollers 25 at the end of the lifting arms begin to rise off the tracks 26 and the body continues to rise to the position shown in Fig. 1. It will be seen that the pull on the flexible connection is along the chain 24 to the rollers 25 and then substantially along the chain 27 and body 14, the direction of the pull being substantially shown as a dotted line 32. It is quite evident that the pull is similar to that of a toggle which we will assume has one arm corresponding to the dotted line 32 and the other arm corresponding to the chain 24 the pull being exerted at the end of the latter. The lifting arm would then be connected to the middle of the toggle at the point where the rollers 25 are and it is seen would raise the body when the toggle was forced to straighten. This lifting arrangement is a decided advantage over the lifting devices now in use as it is a strong and durable device which does not require a tall ugly frame for the operating mechanism in order to raise the body to its uppermost position. The movable frame is provided with a socket 33 situated directly over a socket 34 on the stationary frame 2 so that a pin 35 can be inserted through both to lock the movable frame in normal position. A chain 36 is fastened to the vehicle body and is adapted to extend forwardly to the shaft 37 mounted on the stationary frame 2. This shaft has a squared end so that the handle which operates the shafts 12ª and 12ᵇ can be used to operate it. The chain 36 is suitably fastened to said shaft when it is desired to swing the body and the shaft is then turned and winds up the chain which swings the body. This is necessary when the body is under a heavy load.

While my invention is shown applied to a motor truck it can readily be applied to any suitable truck or chassis.

To form a more solid foundation or base for the body 14 when it is in its normal lowered position I provide plates 38 one at each corner of the movable frame and one at each corner of the stationary frame. These plates tend to act as blocks to give the frame a larger bearing than just the bearing rings 3 and 9 when it is in its normal lowered position.

Many modifications of my invention might be made without departing from its spirit and scope and I do not wish to be confined to the exact details shown.

What I claim as new and desire to secure by Letters Patent is:

In combination with an automobile truck, a rotatable frame thereon, having an upwardly extending portion at its foreend, a series of shafts mounted therein, a series of gear wheels on said shafts, a drum at the top of said vertical extension on said frame, retaining arms at the rear end of said rotatable frame adapted to retain a body in position on said frame, lifting arms at the foreend of said body adapted to extend under said body, a link arm fastened at the end of said lifting arms, a flexible connection at the end of said link arm adapted to wind on said drum on the rotatable frame, and tracks on said rotatable frame adapted to be engaged by said lifting arms to cause said lifting arms to fold under said body when the body is lowered, substantially as and for the purposes set forth.

LAWRENCE BRUDER.

Witnesses:
OLIVER W. SHARMAN,
GOLDIE GORDON.